(No Model.)
W. S. LARSON.
PUMP ATTACHMENT.
No. 582,652. Patented May 18, 1897.
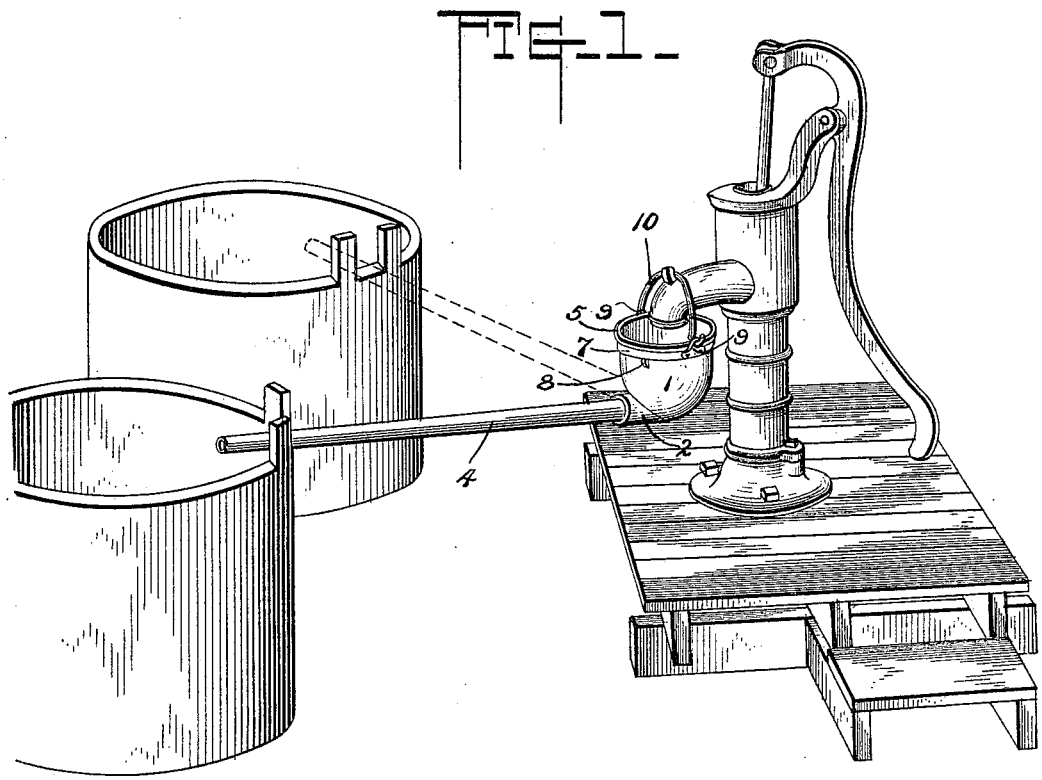
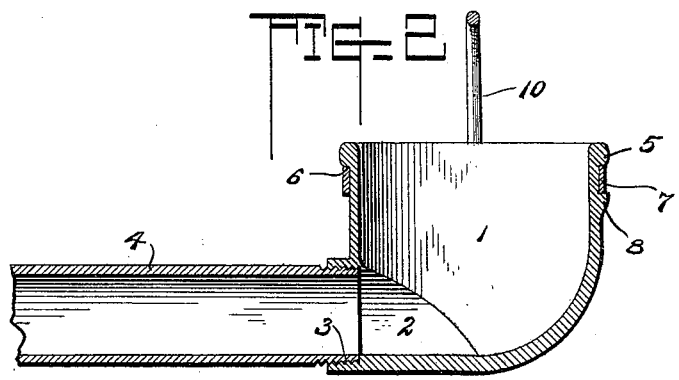
Inventor
William S. Larson,
By his Attorneys.

UNITED STATES PATENT OFFICE.

WILLIAM S. LARSON, OF STROMSBURG, NEBRASKA.

PUMP ATTACHMENT.

SPECIFICATION forming part of Letters Patent No. 582,652, dated May 18, 1897.

Application filed September 28, 1896. Serial No. 607,215. (No model.)

*To all whom it may concern:*

Be it known that I, WILLIAM S. LARSON, a citizen of the United States, residing at Stromsburg, in the county of Polk and State of Nebraska, have invented a new and useful Pump Attachment, of which the following is a specification.

This invention relates to pump attachments; and the object in view is to provide a water-conduit for liquids or loose-running articles, the same being designed particularly for use in connection with pumps and adapted, as hereinafter described, to conduct the liquid in any desired direction, being for that purpose adjustable, so that the discharge end of the device may be swung and carried from place to place, thereby overcoming the liability of spilling the water or other liquid and obviating the disadvantages incident thereto.

To this end the invention consists in certain novel features and details of construction, as hereinafter fully described, illustrated in the drawings, and embodied in the claims.

In the accompanying drawings, Figure 1 is a perspective view showing the improved device and its application to an ordinary pump and receiving-tubs. Fig. 2 is a sectional view of the same.

Similar numerals of reference designate corresponding parts in the several figures of the drawings.

Referring to the drawings, 1 designates the receiving-bowl of the device, which may be of any size or shape, but which for convenience is shown as of inverted cone shape, or, more accurately, with a cylindrical upper portion and a hemispheroidal lower or base portion. At the base of the bowl the latter is extended laterally and substantially at a right angle to form a hollow neck or stem 2 in communication with the bowl and internally screw-threaded, as indicated at 3, to receive the threaded end of a section of pipe or tubing 4, of any desired size or length, for reaching to the receiving-tub or other receptacle into which the liquid is to be conducted.

The bowl 1 is provided at its top edge with an annular rim 5, forming an undercut shoulder 6. Surrounding the bowl 1 and located immediately under the shoulder 6 is a band or annulus 7, preferably of metal, the same being mounted with sufficient looseness on the bowl to allow the bowl to be turned within the same, while leaving said band stationary. Lugs 8 are also formed on the bowl just under the band 7, the same projecting outward from the bowl and forming lower shoulders or stops for maintaining the band 7 in proper position and preventing the slipping of the band off the bowl when the device is out of use. The band 7 is provided at diametrically opposite points with perforated ears 9, which receive the hooked ends of a semicircular or other shaped bail 10, by means of which the bowl is suspended from the spout of the pump, as clearly shown in Fig. 1.

By means of the construction above described it will be seen that the bowl may be readily suspended from any ordinary pump-spout and that the discharge end of the pipe 4 may be carried to any point wished. When one tub or receptacle has been filled, the discharge end of the pipe may be moved to another tub or receptacle, as shown in Fig. 1, without detaching the bowl from the pump-spout, the band 7, as above described, allowing the bowl to turn without disturbing the connection of the bail with the pump-spout. If desired, the pipe 4 may be provided near the bowl or at any convenient point with a branch having a valve, by means of which the water or other liquid may be directed simultaneously to two different points or confined to the one pipe.

It will be understood that the attachment is susceptible of changes in the form, proportion, and minor details of construction without departing from the spirit or sacrificing any of the advantages of this invention.

Having thus described the invention, what is claimed as new is—

1. A pump attachment, comprising a receiving-bowl, a conduit-pipe leading therefrom, a band or annulus surrounding said bowl in such manner as to allow of relative turning of the band and bowl, and a bail connected to said band for suspending the device upon a pump or other object, substantially as described.

2. The herein-described attachment consisting of a receiving-bowl having an annular rim at its top forming a shoulder, a band or annulus loosely surrounding said bowl and engaging beneath said annular rim, stops for preventing the downward movement of said band on the bowl, a bail connected to said band for suspending the bowl, and a discharge-pipe leading from the bowl, substantially as described.

3. The herein-described device, consisting of a receiving-bowl provided at its top edge with a rim forming an annular shoulder, a supporting-band loosely surrounding said bowl and engaging under said shoulder, a supporting-bail connected to said band, and a hollow discharge neck or stem at the base of the bowl, all combined and arranged, substantially as described.

In testimony that I claim the foregoing as my own I have hereto affixed my signature in the presence of two witnesses.

WILLIAM S. LARSON.

Witnesses:
 NATHAN WILSON,
 J. W. WILSON.